Patented Oct. 29, 1935

2,019,141

UNITED STATES PATENT OFFICE 2,019,141

FOOD PRODUCT AND PROCESS OF PRODUCING SAME

John T. Knowles, Chicago, Ill., assignor to Libby, McNeill & Libby, Chicago, Ill., a corporation of Maine No Drawing. Application April 5, 1935, Serial No. 14,955

8 Claims. (Cl. 99—11)

This invention relates to a new and improved process for preparing certain food products such as for instance, the seeds of leguminous vegetables, the kernels of cereals and grain, and similar foods.

This invention also relates to the finished products resulting from this process.

This application is a continuation in part of applicant's copending application, Serial Number 732,254, filed June 25, 1934.

It is an object of this invention to provide a new and improved method of preparing and cooking foods, such as the seeds of leguminous vegetables, grains, cereals, and the like, which is productive of final products, of improved flavor and texture.

It is a further object of this invention to provide a process for the preparation of foods of the type herein referred to by which the improved flavor and texture produced is that which closely resembles the flavor and texture of such products when baked or roasted, such as when cooked in an oven.

In connection with the above stated object, it is a further object of this invention to provide a process which may be employed with special advantage for the preparation of beans such as for instance, navy beans, or their equivalent, and so as to produce cooked bean products which resemble with great accuracy, in flavor and texture and other detectable qualities, beans cooked in baking ovens, whereby with various sauces, flavorings, and the like, beans of the so-called baked bean style may be produced without the long, tedious and expensive baking processes now required. It is therefore possible by this process, to produce a very superior bean product which resembles with great accuracy, the well known and so-called "Boston style" baked beans.

It is a further object of this invention to provide a process of preparing various foods of the type herein referred to which includes in combination the steps of first, adjusting the water content of the particular food to a relatively high level, as by soaking or the like, then cooking said food in oil or fat for a predetermined period at a predetermined temperature, and finally, completing the cooking in the presence of moisture so as to at least partially restore the moisture content, which is reduced by the first cooking step, and thereby render the products soft and edible and of fine flavor and texture. It is found that the final quality and character of the foods so treated is not produced by either step alone, but by the combination of cooking steps as herein more fully pointed out. Although this invention is not so restricted, it is well adapted to the production of canned products, in which case the second cooking step may be accomplished in the sealed cans.

A further object of this invention is to provide finished products resulting from the process herein referred to and to provide other advantages and improvements which are not herein specifically mentioned, but which will readily appear to one skilled in the art as the following description proceeds.

It is to be understood that this invention is applicable to the seeds of leguminous vegetables, to the kernels of cereals and grains, and all similar products and that the invention is based upon the discovery that the combined steps herein described of first, oil cooking and then moisture cooking, imparts a new and superior flavor and texture to this type of foods which resembles closely, the rich and meaty flavor produced by baking or roasting operations.

Purely by way of illustration, one method of practicing the invention is hereinafter given as applied to the production of canned beans. The beans of this example resemble closely, the flavor and texture of oven baked beans and with the proper sauce, can be made to accurately duplicate the so-called "Boston style" baked beans. The invention however, is not to be restricted to the present disclosure but is to be determined from the appended claims.

In accordance with this illustrative procedure, beans, preferably navy beans, are first soaked in water at ordinary room temperature, for example, at 60 to 70 degrees F. The beans are preferably soaked for a period of approximately eighteen hours. The extent of the soaking depends upon the temperature of the soaking bath and the soaking period and consequently the period may be shortened if higher temperatures are employed. For instance, it is practical to employ a soaking period of approximately four hours by utilizing soaking temperatures of between 120 to 140 degrees F. Naturally, any intermediate time and temperature ratio may be utilized. The soaking operation serves to swell and soften the beans and to thus better prepare them for the following cooking treatments. It also serves to remove some of the excess starch.

In commercial practice, the beans thus soaked are next passed over a rippling machine of the usual character so as to remove stones or other heavy impurities.

The soaked beans are preferably blanched after the soaking operation although this is not absolutely essential, for instance, kidney beans produce a good product without blanching. This may be accomplished by steaming or boiling in water so as to eliminate a certain amount of air and excess starch from the beans and also to adjust the moisture of the beans to uniform content. In commercial practice it is highly desirable to have all of the beans of the finished product substantially uniform in texture and appearance and it is found that this depends upon the moisture content of the beans while undergoing the cooking treatment.

It is found that with the various foods herein mentioned that the individual seeds or kernels have different water absorption properties and therefore mere soaking may not produce a uniform water content. However, the blanching operation is found to produce substantially a uniform water content which in the case of beans treated as herein provided is approximately between 53 per cent and 55 per cent, by weight. The blanching operation is likewise dependent upon the time and temperature employed and when hot water is used, satisfactory results may be accomplished in a treatment period of approximately six minutes at a temperature of approximately 210 degrees F. Of course the temperature may be reduced if the blanching period is prolonged.

Whereas the soaking and blanching operations may be conducted either by batches or by a continuous operation, the soaking has been satisfactorily accomplished by batch treatment in soaking tanks, and the blanching in a continuous squirrel cage blancher. This type of blancher comprises an enlarged cylinder having a spirally arranged fin on the inside. The cylinder is of such diameter and length as to satisfactorily accommodate the desired quantity undergoing treatment, and is rotated at a speed to cause the beans to pass therethrough in the desired period of time.

The next step of the process comprises cooking in oil or fat, such as for instance, hog lard, or any other suitable edible oil or fat. The amount of fat employed may be varied but is preferably four times that of the weight of the beans to be cooked. In this illustrative procedure the beans are added after the fat has been raised to a temperature of substantially 280 degrees F. The addition of beans causes a lowering of the temperature of the fat to approximately 230 degrees F. It is possible to conduct this operation either in batches or by a continuous operation, but when conducted by batch treatment, a steam jacketed open top kettle may be employed. After adding the beans the temperature of the oil will be reduced, usually to approximately 230 degrees F. after which the temperature of the oil rises again to approximately 240 degrees F. This rise in temperature will generally require approximately 6 or 7 minutes when 165# steam pressure is employed. Under this procedure the cooking is then continued at this temperature for approximately 30 minutes more, making a total cooking time of approximately 35 minutes. During this cooking operation, the moisture content of the beans is substantially reduced to a point somewhere between 15 per cent to 22 per cent, usually approximately 18 per cent.

The beans as thus cooked will be somewhat shrivelled as compared to their swelled size and in addition, are relatively hard and tough. In color, they are slightly brown or what may be better described as a whitish or light golden brown. Furthermore, the beans will contain some absorbed fat or oil, and as taken out of the fat are found to contain approximately 10⅔ per cent by weight when lard is employed.

The temperature employed in the oil cooking step is very important to the results desired, as care must be taken to avoid temperatures which are too high. It is known that temperatures in the neighborhood of 375 degrees F. to 400 degrees F. have been employed for quickly cooking soya beans and the like to impart thereto brittle and "roasted-nut" like properties. Such processes have been used for the purpose of producing imitation nuts and for rendering beans crumbly and grindable for purposes of making imitation peanut butter, but temperatures which produce these properties are too high for the purposes of this invention. When the beans are cooked at such high temperatures the moisture elimination is too rapid and the beans are cooked so fast that they do not shrink and do not shrivel but are rendered hard, crumbly, and brittle, and the beans are of approximately the original swelled size. (See U. S. patent to Baile, No. 1,615,822). Hard and brittle beans of large size have no substantial water absorption properties and are not capable of being again softened and swelled as is essential to the present process.

Thus there is a critical temperature beyond which this invention cannot be practiced, which temperature is in the neighborhood of 325 degrees F. as the upper limit and preferably not greater than approximately 300 degrees F. Below this critical temperature the temperature employed in practice may be varied according to the cooking period employed, and also according to the amount of heat in the fat or oil, that is, according to the volume of fat or oil employed, in proportion to the volume of beans or other leguminous vegetables being treated. If the time is prolonged a reduced temperature may be employed with the same results, or if the volume of oil or fat is proportionally increased or if the oil or fat is more efficiently heated or is stirred, a shorter cooking period may be employed for any given temperature below the critical temperature. For instance, if a continuous cook is employed in the above illustrative procedure instead of the batch treatment and the oil is circulated, the cooking period may be reduced to approximately 15 minutes or less when the oil is maintained at approximately from 250 degrees F. to 280 degrees F.

The essential feature of this oil cooking step is to impart to the beans the following characteristics, namely; a shrivelled, hard, and tough consistency, the capability of absorbing a substantial quantity of moisture and to again soften and swell to the original swelled size, the presence therein of an appreciable quantity of absorbed oil or fat, a substantial reduction of the original water content, and a substantial conversion of the starch to eliminate the characteristic starchy bitter taste. It is these properties of the beans which characterize and determine the oil cooking step of this process, and so long as the beans are given the above enumerated properties, any desired temperature-time ratio may be employed and thus, it is to be understood that this invention is not to be limited except as herein explained and to temperatures below the critical temperature.

Inasmuch as moisture must be eliminated, and preferably at a rapid and efficient rate, the temperature must be at least 212 degrees F. and thus it may be seen that the temperature range contemplated is from 212 degrees F. to approximately 325 degrees F. and preferably from 212 degrees F. to 300 degrees F.

The next step of the process is described in connection with the production of canned products, in which event the cans which have been previously washed and sterilized are charged with the oil cooked beans immediately after they have been removed from the oil or fat. In accordance with usual commercial methods, the beans will be introduced into the cans at a temperature somewhere around 200 degrees F. The charge of beans in each can should be adjusted to approximately one quarter of the volume of the can. Thereafter, a suitable sauce is added. If desired, a piece of pork may be added to the can. In practice, it is found that a one ounce piece of pork is satisfactory for a 16 ounce can of beans. The pork may be added cold. The sauce is preferably added boiling hot and in quantity sufficient to entirely fill the cans, that is to say, so that no appreciable space is left in the cans after they are sealed.

The quantity of beans added to the can is dependent upon the moisture content because the oil cooked beans have great absorptive powers in the presence of the sauce which is added. This is important in producing a finished product of the right fluidity or consistency, because the dryness or liquidity of the product is determined by the softness of the beans and amount of unabsorbed sauce which is present. Consequently, in commercial production of uniform products, it is desirable to have the beans of substantially uniform moisture content when they are placed in the cans. For 16 ounce cans, approximately 4½ ounces of beans having a water content of substantially 17.6 per cent by weight, give good results.

After sealing the cans by any usual machinery, a further cooking operation is conducted. This may be accomplished by subjecting the cans and the contained beans to steam for approximately 100 minutes at 250 degrees F. or the equivalent of this time and temperature ratio. This temperature is conveniently produced by employing a steam pressure of approximately 20#. When a higher temperature, say for instance, 260 degrees F. is employed, the cooking period can be reduced to approximately 90 minutes.

After the product is thus cooked, the cans may be cooled in the usual way such as by a water spray in a retort or by over night exposure to air at room temperature.

During this last cooking treatment, the product is thoroughly sterilized and completely cooked to produce the desired flavor and texture. Furthermore, the beans absorb the sauce and again swell to completely fill the cans. Also, certain additional chemical changes occur which are productive of the superior flavor and texture herein referred to. For instance, the starches hydrolize to some extent and thereafter, in all probability are caramelized and blended with the sauce to produce the desired flavor. The production of the improved flavor and texture in these products is believed to be attributable to the combination of steps of first cooking in oil as above described, and secondly, continuing the cooking operation in the presence of moisture, as for instance, in a sauce, whereby the product is swelled and converted chemically in the manner described.

The oil cooking step subjects the foods so treated, such as for instance, beans, to the uniform temperature which is directly applied to the surface of all of the beans at the same time and for the same period. The preferable temperatures are in cooking effect comparable to those employed in baking ovens but due to the direct and uniform application of the heat, the prolonged and expensive treatment required for baking is avoided.

A large part of the baking period employed for producing baked products is consumed in bringing the more remote portions of the product up to the proper temperature and as a consequence, those portions which are first heated undergo an undesirable over-cooking. By the use of the oil, which applies uniformly and directly the desired heat, a chemical change is produced in the product similar but superior to that produced in baking. Thereafter, the finished products are produced upon completion of the second step, during which the moisture content is restored and the foods undergo a further change productive of the desired flavor and texture.

The oil cooking treatment lends itself particularly well to the production of products like those products baked with animal fat, such as pork, because the percentage of fat or oil absorbed during the oil cooking step is comparable to that present when fat or pork is added in the baking processes.

It is to be understood, however, that the invention has many applications, for instance, it may be applied to many different foods other than beans, and furthermore, the fat may be a vegetable instead of animal origin. In this way, excellent products which are entirely of vegetarian character, may be produced.

An oil, such as peanut oil, refined cotton seed oil, olive oil, or other vegetable oil may be employed with the complete avoidance of an'mal fat. Furthermore, various sauces may be employed or products made without sauces as desired. Also, cereals and grains may be prepared by this process, with the result that they are given a new, desirable and superior flavor and texture, which characterizes them as good commercial products.

I claim:

1. The process of preparing seeds of leguminous vegetables, kernels of cereals or grain, and like foods, which consists in; cooking said foods in hot oil or fat at a temperature of between 212 degrees F. and approximately 325 degrees F. to an extent productive of appreciable reduction in the moisture content, appreciable absorption of oil or fat, a somewhat shrivelled condition, and good moisture absorption properties; then, removing the foods thus treated from the oil or fat and sealing them in cans with added moisture; and finally, subjecting said sealed cans and contained foods to a cooking heat until the contained foods are completely cooked and softened and swelled by the action of heat and the absorption of moisture.

2. The process of preparing seeds of leguminous vegetables, kernels of cereals or grain, and like foods, which consists in; soaking said foods in water to swell the same; cooking said foods in hot oil or fat at a temperature of between 212 degrees F. and approximately 325 degrees F. to an extent productive of appreciable reduction in the moisture content, appreciable absorption of oil or fat, a somewhat shrivelled condition, and good moisture absorption properties; then, removing the foods thus treated from the oil or fat and sealing the same in cans with added moisture; and finally, subjecting said sealed cans and contained foods to a cooking heat until the contained foods are completely cooked and softened and swelled by the action of heat and the absorption of moisture.

3. The process of preparing seeds of leguminous vegetables, kernels of cereals or grain, and like foods, which consists in; soaking in water and blanching said foods; cooking said foods in hot oil or fat at a temperature of between 212 degrees F. and approximately 325 degrees F. to an extent productive of appreciable reduction in the moisture content, appreciable absorption of oil or fat, a somewhat shrivelled condition, and good moisture absorption properties; then, removing the foods thus treated from the oil or fat and sealing the same in cans with added moisture; and finally, subjecting said sealed cans and contained foods to a cooking heat until the contained foods are completely cooked and softened and swelled by the action of heat and the absorption of moisture.

4. The process of preparing seeds of leguminous vegetables, kernels of cereals or grain, and like foods, which consists in; cooking said foods in hot oil or fat at a temperature of between 212 degrees F. and approximately 325 degrees F. to an extent productive of appreciable reduction in the moisture content, appreciable absorption of oil or fat, a somewhat shrivelled condition, and good moisture absorption properties; then, removing the foods thus treated from the oil or fat and sealing the same in cans with an added sauce; and finally, subjecting said cans and contained foods and sauce to cooking heat to an extent to completely cook said foods and to soften and swell the same by the action of heat and the absorption of said sauce.

5. The process of preparing beans which consists in soaking in water; cooking said beans in hot oil or fat at a temperature of between 212 degrees F. and approximately 325 degrees F. to an extent productive of appreciable reduction in the moisture content, appreciable absorption of oil or fat, a somewhat shrivelled condition of said beans and good moisture absorption properties; then, removing the beans thus treated from the oil or fat and sealing them in cans with added sauce; and finally, subjecting said cans and contained beans and sauce to a cooking heat to completely cook said beans and to soften and swell the same by the action of the heat and the absorption of said sauce.

6. The process of preparing beans which consists in soaking in water and blanching said beans; cooking said beans in hot oil or fat at a temperature of between 212 degrees F. and approximately 325 degrees F. to an extent productive of appreciable reduction in the moisture content, appreciable absorption of oil or fat, a somewhat shrivelled condition of said beans and good moisture absorption properties; then, removing the beans thus treated from the oil or fat and sealing them in cans with added sauce; and finally, subjecting said cans and contained beans and sauce to a cooking heat to completely cook said beans and to soften and swell the same by the action of the heat and the absorption of said sauce.

7. The process of preparing beans which consists in soaking said beans in water to swell the same; cooking said beans in oil or fat which has a temperature of approximately 240 degrees F. for a period productive of a substantial reduction in moisture content and a substantial elimination of the starchy bitterness of said beans; then removing from the oil or fat the beans thus treated and sealing them in cans with added moisture; and finally, subjecting said cans and contained beans and moisture to a cooking heat to completely cook said beans and to soften and swell the same by the action of the heat and absorption of said moisture.

8. The process of preparing beans which consists in soaking said beans in water to swell the same; cooking said beans in hot oil or fat which has a temperature of approximately 240 degrees F. for a period productive of a substantial reduction in moisture content and a substantial elimination of the starchy bitterness of said beans; then removing from the oil or fat, the beans thus treated and sealing them in cans with added sauce; and finally, subjecting said cans and contained beans and sauce to a cooking heat to completely cook said beans and to soften and swell the same by the action of the heat and absorption of said sauce.

JOHN T. KNOWLES.